United States Patent [19]

Hermanns

[11] 4,312,240

[45] Jan. 26, 1982

[54] CORROSION-RESISTANT VARIABLE AREA FLOWMETER

[75] Inventor: Henry M. Hermanns, Rydal, Pa.

[73] Assignee: Fischer & Porter Company, Warminster, Pa.

[21] Appl. No.: 155,169

[22] Filed: Jun. 2, 1980

[51] Int. Cl.³ .............................................. G01F 1/22
[52] U.S. Cl. .................................................. 73/861.57
[58] Field of Search ............ 73/861.55, 861.56, 861.57

[56] References Cited

U.S. PATENT DOCUMENTS

| | | | |
|---|---|---|---|
| 3,164,989 | 1/1965 | Busillo et al. | 73/861.56 |
| 3,315,523 | 4/1967 | Conkling | 73/861.56 |
| 3,416,370 | 12/1968 | Kaucher et al. | 73/861.55 |
| 3,894,433 | 7/1975 | Riester | 73/861.56 |

Primary Examiner—Herbert Goldstein
Attorney, Agent, or Firm—Michael Ebert

[57] ABSTRACT

A flowmeter of the variable area type capable of measuring corrosive liquids and gases and including a metal metering tube having a corrosion-resistant PTFE liner. To match the corrosion-resistance properties of the lined metering tube, the float assembly operating within the tube is mainly of FEP construction, the float head of the assembly which engages the inner wall of the metering tube being constructed of tantalum.

10 Claims, 7 Drawing Figures

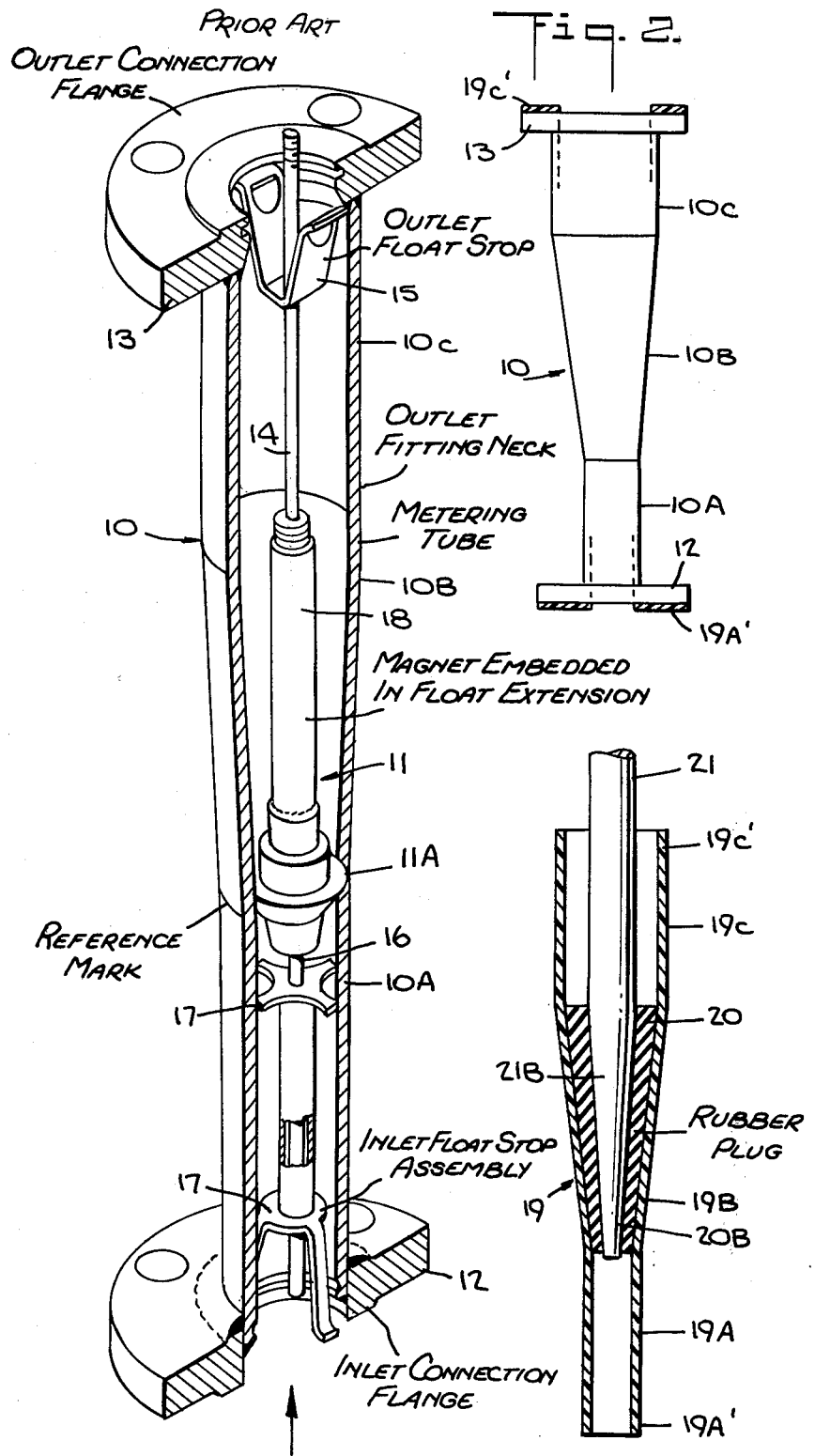
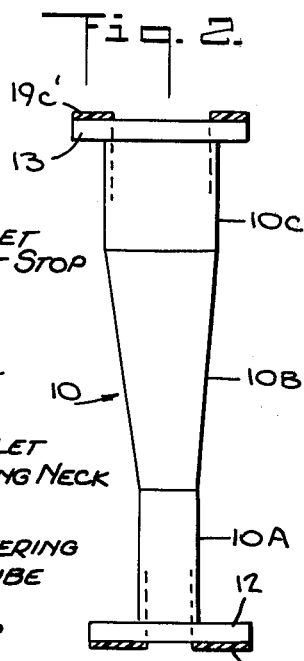
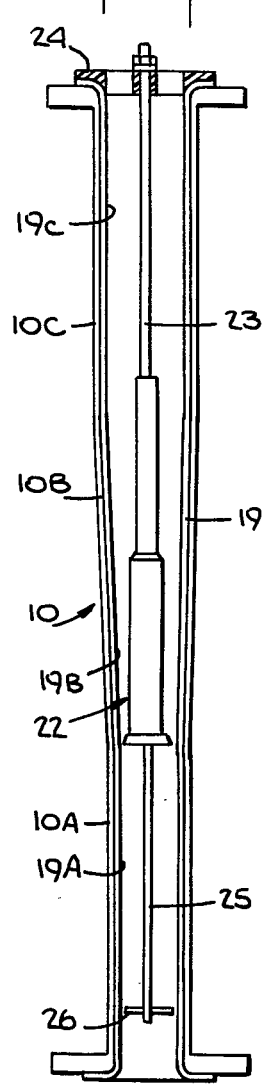

CORROSION-RESISTANT VARIABLE AREA FLOWMETER

BACKGROUND OF INVENTION

This invention relates generally to flowmeters of the variable area type, and more particularly to a technique for installing a protective plastic liner in the metal metering tube of the flowmeter and for providing a float appropriate to a lined metal metering tube.

In a flowmeter of the variable area type such as the meter disclosed in the Evans et al. U.S. Pat. No. 4,050,305, a gas or liquid admitted into the lower end of the tube emerges from the upper end thereof, the float operating within the tube being raised to a position of dynamic equilibrium between the downward gravitational force of the float and the upward force of the fluid flowing through the annular orifice surrounding the float. The vertical position assumed by the float depends upon the rate of fluid flow. In a flowmeter which makes use of a glass metering tube, the float position is indicated along a calibrated scale on the front of the tube.

The pressure rating of a variable area glass metering tube depends on the tensile characteristics of the glass as well as on the wall thickness. However, the maximum pressure rating of a given glass metering tube affords no assurance that breakage will not occur at pressures below this rating; for glass is brittle and may break upon accidental impact if the glass is subject to thermal shock. Also, surface scratches, nicks or cracks may cause breakage when the tube is pressurized or subject to vibration or to liquid hammering.

To overcome the drawbacks inherent in flowmeters having glass metering tubes, it is known to provide an all-metal meter suitable for high pressure and high temperature service. One such flowmeter is the Vertarator 500 Armored Throughflow Flowmeter manufactured by Fischer & Porter Company of Warminster, Pa., and described in their Instruction Bulletin 10A5004, published December 1978. Because this meter is of all-metal construction and the float cannot be seen, an indicator device must be used in conjunction with the meter.

This indicating device, in the case of the Vertarator 500 meter, takes the form of a permanent magnet embedded in a float extension and riding up and down with the float in accordance with flow rate, the permanent magnet being magnetically coupled to a rotatable follower magnet external to the flow tube. In operation, as the float magnet shifts in the axial direction within the meter tube, the follower magnet is caused to rotate to a degree reflecting this shift. The shaft of the follower magnet is provided with a pointer which operates along a scale to indicate flow rate.

The Vertarator 500 metal meter tube has a straight-through flow design, the tube being composed of an inlet section of uniform diameter which leads to a tapered intermediate section whose enlarged upper end joins an outlet section of uniform diameter. This meter design has no recessed or stagnant areas and the metered fluid is less likely to solidify or deposit solids within the tube; hence the dependability of the meter is enhanced.

When, however, a metal metering tube of this type is used to measure the flow rate of corrosive fluids, it is desirable to provide a protectively-lined tube to prevent corrosion of the metal. A suitable lining material for this purpose is polytetrafluoroethylene (PTFE) which is available commercially from E. I. duPont as "Teflon." This material is immune to attack by virtually all corrosive fluids and serves, therefore, to protect the metal lined thereby.

It is essential that the Teflon liner conform very accurately to the metal tube. This presents little difficulty with a tube of uniform cross section throughout its length; but when the tube has inlet and outlet sections of different diameter and a tapered intermediate section as in the Vertarator 500, then the formation and installation of a protective liner without buckling or distortion is troublesome.

Since the float used in a variable area flowmeter whose metal tube is Teflon-lined must also be corrosion-resistant, it is desirable to construct the float of Teflon as well. But several of the float parts must be made of harder material to attain an acceptable degree of accuracy and durability.

SUMMARY OF INVENTION

In view of the foregoing, the main object of this invention is to provide a variable-area flowmeter having a metal metering tube and a float assembly operating therein, both the tube and the assembly being fabricated of corrosionresistant materials whereby the meter is usable in the measurement or corrosive gases and liquids.

More particularly, it is an object of the invention to provide a flowmeter of the above type in which the metering tube is lined with PTFE film material, and the body of the float assembly is formed of FEP material, a permanent magnet being housed in and sealed within this body whereby the changing position of the float assembly in the tube may be indicated by means of a follower magnet external to the tube and magnetically coupled to the float magnet, the magnet being isolated from the corrosive fluid.

Also an object of the invention is to provide a technique for installing a protective PTFE liner in a variable-area metal metering tube.

Briefly stated, these objects are attained in a variablearea flowmeter whose metal metering tube has a straight-line cylindrical inlet section joined to a tapered intermediate section whose input has the same internal diameter as that of the inlet section, the output of the intermediate section being joined to a straight-line cylindrical outlet section whose relatively large internal diameter is the same as said output, the tube being provided with inlet and outlet connection flanges.

Installed within the metal metering tube is a molded liner of PTFE material having inlet, intermediate and outlet sections which intimately conform to the corresponding sections of the tube, the liner having end portions which are flared over the flanges of the tube to provide protective covers therefor.

Operating within the tube and axially shiftable therein as a function of flow rate is a float assembly including a cylindrical body formed of FEP material, the body having a major section housing a permanent magnet and a minor section enclosing the housing and thermally welded to the major section to a seal said magnet therein. An annular float head of tantalum is supported by the body.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a prior art variablearea flowmeter which is cut away to expose the float assembly;

FIG. 2 illustrates, in longitudinal section, a metal metering tube having a PTFE liner installed therein in accordance with the invention;

Figure 5:
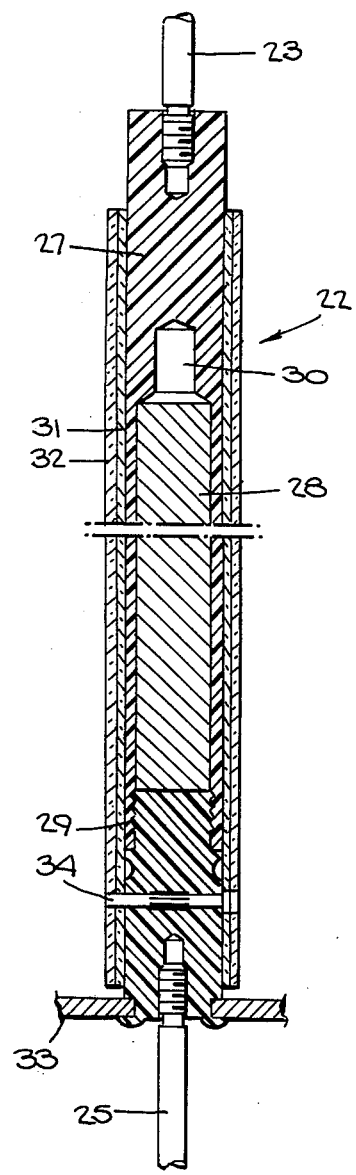
Figure 6:
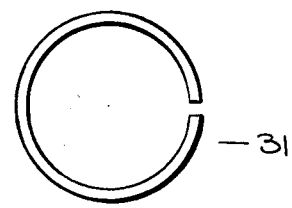

FIG. 3 separately shows the molded PTFE liner before it is installed, and the rubber plug therein to facilitate installation;

FIG. 4 is a longitudinal sectional view of a variable area flowmeter in accordance with the invention;

FIG. 5 is a longitudinal sectional view of the float assembly included in the meter;

FIG. 6 is a transverse section taken through the inner sleeve of the meter; and

Figure 7:
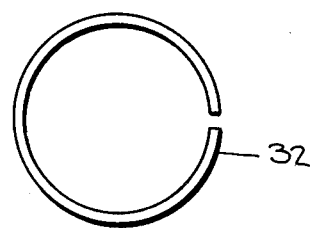

FIG. 7 is a transverse section taken through the outer sleeve.

DESCRIPTION OF INVENTION

Prior Art

Referring now to FIG. 1, there is shown a typical variable area flowmeter which includes a precision-formed metal metering tube 10 fabricated of stainless steel or similar material and a weighted metering float assembly operating therein, generally designated 11, the assembly including a float head 11A.

Metering tube 10 is constituted by a straight-line cylindrical inlet section 10A provided with an inlet connection flange 12. This section leads into a tapered intermediate section 10B whose input diameter matches that of the inlet section and whose output diameter matches that of a straight-line cylindrical outlet section 10C to which the intermediate section is joined. Outlet section 10C is provided with an outlet connection flange 13.

The liquid or gas whose flow rate is to be measured enters the small diameter inlet and flows upwardly past float 11 en route to the outlet where the largest diameter is encountered. Float assembly 11 is guided axially at its upper end by an outlet guide rod 14 which extends through an outlet float stop 15. The assembly is guided axially at its lower end by an inlet guide rod 16 which extends through an inlet float stop sub-assembly 17. Thus the axial displacement of the float is restricted to limits defined by the stops, lateral displacement thereof being prevented.

Fluid flow through the metering tube positions the float therein in accordance with flow rate, the float being in dynamic balance when its weight is less than the weight of the fluid it displaces, is equal to the upward force imposed on the float as a result of fluid velocity. With an increase in flow rate, float assembly 11 will move upwards in the axial direction; for the upward fluid force plus the buoyant effect of the float exceeds the downward force due to gravity. As the float assembly rises, the annular area between the float head 11A and the tube increases until a point is reached at which the upward and downward forces are again equalized in dynamic balance.

Since the metering tube is of metal construction and the float therein cannot be seen through the opaque tube, an indicating system must be used in conjunction with the meter. To this end, a housing containing a magnetic follower (not shown) is bolted to the metering tube to detect the position of the float. The float assembly is provided with a cylindrical extension 18 which encases a permanent magnet formed of Alnico or similar hard magnetic material. As the assembly moves vertically, due to changes in flow rate, the follower magnet in the indicator housing which is magnetically coupled to the float magnet is caused to rotate to keep the magnet forces in balance. The structure and function of the indicator device forms no part of the present invention.

As pointed out in the introductory section, the problem with a typical flowmeter of the type illustrated in FIG. 1 is that the inner wall of the metal metering tube and the materials of the float assembly and the guide rods therefor are exposed to the fluids being metered; and when the fluids are corrosive in nature and react with the tube and float materials, the resultant erosion will eventually render the flowmeter inoperative. Moreover, should metal wall corrosion result in leakage of fluid through the metering tube, this may be hazardous to personnel in the vicinity of the flowmeter.

Metering Tube Liner

Referring now to FIGS. 2 and 3, we shall now in conjunction with these figures describe a technique in accordance with the invention for installing a liner 19 of PTFE or Teflon film material in metal metering tube 10. This tube is formed by a straight-line inlet section 10A provided with an inlet connection flange 12, an intermediate tapered section 10B and a straight-line outlet section 10C provided with an outlet connection flange 13. The internal diameter of inlet section 10A which matches the input diameter of tapered section 10B is small relative to that of outlet section 10C whose internal diameter matches the output of tapered intermediate section 10B.

Liner 19 is provided with sections which correspond to those of the metal metering tube and is therefore composed of a straight-line inlet section 19A, a tapered intermediate section 19B and a straight-line outlet section 19C.

Teflon liner 19 is molded to dimensions that are slightly oversize with respect to those of metal metering tube in which it is to be installed in order to obtain an interference fit therebetween. Since the liner is used not only to protectively line the inner wall of the metering tube but also to cover the surface of the connection flanges, the length of inlet section 19A is made greater than that of tube inlet section 10A to provide an extension 19A' to be flared over inlet flange 12, as shown in FIG. 2, and thereby form an annular liner thereon. Similarly, the length of outlet section 19C is greater than that of outlet section 10C to provide an extension 19C' to be flared over outlet flange 13.

With a metal metering tube having a tapered section, it is essential that the liner precisely conform to the surface of all sections of the tube and be free of buckling or warping that would effectively modify the internal cross section of the flow conduit.

At the outset of the installation procedure, the PTFE liner is at room temperature, whereas the metal metering tube is heated to a temperature of 400° F. or higher (depending on the metal being used) in order to thermally expand the tube before the liner is inserted. In practice, heat transferred from the tube to the liner in the course of installation renders the liner more compliant.

In order to bring about full conformity between the intermediate sections of the tube and liner, a plug 20 formed of an elastomeric material such as Neoprene or Dow Corning material TRV 3120 is forced into the intermediate section 19B of the liner. The external geometry of plug 20 corresponds to that of the tapered intermediate section of the liner, but its dimensions are slightly oversize with respect thereto, so that in forcing in the resilient plug, it exerts a pressure on the liner to force it to conform to the tapered section and prevent it from buckling during the insertion procedure.

Then liner 19 is inserted into tube 10 so that the intermediate section 19B lies within intermediate section 10B of the tube, while inlet and outlet sections 19A and 19C lie within their corresponding tube sections, with extensions 19A' and 19C' projecting from the ends of the tube.

To augment the pressure exerted by plug 20 on the intermediate section of the liner, the plug is provided with a longitudinally-extending central bore 20B having a taper matching the taper of the plug. A rod 21 having a tapered leading end 21B is then forced into the tapered bore 20B of the plug to dilate the material of the plug outwardly and thereby impose a still greater pressure on the intermediate section 19B of the liner.

The rod is kept inserted in the plug bore until the metal tube has cooled, in the course of which the tube contracts to its normal dimensions. Finally, the ends 19A and 19C of the liner are flared over the end flanges of metal tube 10 to complete the installation. Thus all areas of the metal tube exposed to process fluid are protectively covered with a corrosion-resistant material.

New Flowmeter

As indicated previously, in a variable area flowmeter used for metering corrosive liquids and gases, all parts in contact with the process fluid must be made of corrosionresistant material. Hence it is not only necessary to protectively line the metal metering tube, but the float assembly operating in the tube and axially shiftable therein as a function of flow rate must also be of material non-reactive with the process fluid.

In a metal metering tube made in accordance with the invention as shown in FIG. 4, the liner 19 therefor is of PTFE material. While it is possible to make float assemblies of PTFE components, the intrinsic characteristics of this material creates certain fabrication problems. For this reason, in the float assembly generally designated by numeral 22, the main components thereof are of FEP, a related fluoroplastic material having certain advantages in the context of float construction. Float assembly 22 is provided with an upper guide rod 23 which extends through a PTFE float stop and guide 24, and a lower guide rod 25 provided with crossed guide pins 26.

PTFE (Teflon TFE of E. I. du Pont or Halon TFE of Allied Chemical) is a fluoroplastic material formed by polytetrafluoroethylene. Because PTFE has a high melt viscosity, it cannot be processed by conventional molding and melt extrusion techniques. Fluorinated ethylene propylene, commonly abbreviated as FEP is a fluoroplastic having corrosion-resistant properties similar to PTFE, for both resins are quite stable at high temperature and both maintain their thoughness at low temperatures. PTFE and FEP fluoroplastics have a low dielectric constant, low coefficient of friction and very desirable antisticking characteristics, the latter being a great advantage when these materials are used in metering heated fluids. However, unlike PTFE, FEP material is a true thermoplastic, and conventional molding and fabrication methods can therefore be used therewith.

Because PTFE material cannot be welded or fused, a float assembly made of PTFE components requires that the components be cemented together, in which case the PTFE components must first be etched to accept cement. This not only results in joints of marginal strength but also give rise to junctions subject to corrosion by the process fluid; for the cement, usually an epoxy, lacks the corrosion-resistance properties of fluoroplastic materials. Hence cemented PTFE float assemblies of the type heretofore known are not fully corrosion-resistant, nor are they characterized by high strength.

FIG. 5 shows the body of float assembly 22 in greater detail. It includes an upper body section 27 in the form of a cylindrical block of FEP material having a deep circular bore therein which accommodates a cylindrical permanent magnet 28. Magnet 28 is shorter in length than the bore in which it is housed, so that the mouth end of the bore defines a socket 29 adapted to threadably receive the reduced-diameter plug portion of a lower body section 30 which encloses magnet 28.

Upper body section 27 is thermally welded to the lower body section 29 to hermetically seal and protect the magnet housed therein. Before magnet 28 is inserted in the bore in the upper body section, a well 30 of reduced diameter at the upper end of the bore is half filled with a low viscosity epoxy which, when the magnet is inserted, flows around the top thereof to hold the magnet in place and prevent longitudinal movement thereof.

Fitted over the body of the float assembly and surrounding lower body section 30 and that portion of the upper body section 27 which includes magnet 28 is a float-weight sleeve having an inner section 31 and an outer section 32 both being preferably formed of tantalum.

In lieu of tantalum, the float weight sleeve can be made of a corrosion-resistant ceramic compatible with the process fluid. However, since the density of tantalum may be as much as eight times greater than a typical ceramic, it becomes possible to obtain the same weight with considerably less volume of tantalum. But because tantalum is quite expensive, rather than drill out bar stock to make the inner and outer sleeves with a resultant waste of most of the tantalum, the preferred procedure to form the sleeves is to bend tantalum sheet material into sleeves.

Thus FIG. 6 shows inner sleeve 31 formed of a bent sheet of tantalum, while FIG. 7 shows a similarly-made outer sleeve 32.

A disc-shaped float head 33 is supported on a reduced diameter end portion of lower body section 29, this end portion being heat formed to lock the float head in place. The weight of the inner and outer tantalum sleeves 31 and 32 is carried by a tantalum pin 34, so that there is a space between the weight sleeves and the float head. Any impact loads are carried by the float body, not the float head.

The lower body section 29 and sleeves 31 and 32 are drilled as individual parts to receive tantalum pin 34 rather than at assembly. Hence the individual holes drilled in these components may not line up exactly. For this reason, the hole in one side of the sleeves is drilled oversize and at assembly the tantalum pin is inserted through the large hole in the sleeves, pressed through the FEP body and then through the close fitting hole in the opposite side of the sleeve 32.

Because float head 33 must be made of a harder and more durable material than a fluoroplastic and yet be similarly corrosion-resistant, float head 33 and also retaining pin 34 are made of tantalum, this being true, of course, of the sleeves as well. Tantalum is a ductile metal that is easily fabricated. When exposed to the atmosphere, this metal forms a tough and impermeable $Ta_2O_5$ film which protects it from corrosion and renders it highly resistant to chemical attack at temperatures below about 150° C. Tantalum resists corrosion by all acids except fuming $H_2SO_4$, HF and acid solutions containing fluoride ions, and it reacts very slowly with alkali solutions.

While there have been shown and described preferred embodiments of a corrosion-resistant variable area flowmeter in accordance with the invention it will be appreciated that many changes and modifications may be made therein without however departing from the essential spirit thereof. Thus instead of tantalum, use may be made of Hastelloy C—a high strength nickel base, corrosion-resistant alloy.

I claim:

1. A variable-area flowmeter for measuring corrosive fluids, said flowmeter comprising:
    A. a metal metering tube having a straight line cylindrical inlet section joined to a tapered intermediate section whose input has the same internal diameter as that of the inlet section and whose relatively large diameter output is joined to a straight line cylindrical section having the same internal diameter, the fluid to be metered being admitted into the inlet section to flow upwardly through the tube for discharge from the outlet section, said tube being internally lined with PTFE material which intimately conforms to the inner surface of the sections thereof; and
    B. a float assembly operating in said tube and axially shiftable thereon as a function of flow rate, said assembly including a cylindrical body formed of FEP material, said body having an upper section housing a permanent magnet and a lower section completing said housing and thermally welded to the upper section to hermetically seal said magnet therein, and an annular float head supported by said body.

2. A variable-area flowmeter as set forth in claim 1, wherein said tube is provided at its ends with inlet and outlet connection flanges having protective covers of PTFE material.

3. A variable-area flowmeter as set forth in claim 2, wherein the meter tube lining and the flange covers are defined by a tube molded of PTFE material having essentially the same geometry as said metal tube, with end extensions which are flared over the flanges to define said covers.

4. A variable-area flowmeter as set forth in claim 1, wherein said float head is formed of tantalum.

5. A variable-area flowmeter as set forth in claim 4, further including an outlet guide rod of tantalum anchored at the end of said upper section and extending axially therefrom.

6. A flowmeter as set forth in claim 5, wherein said outlet guide rod extends through a PTFE float stop and guide.

7. A variable-area flowmeter as set forth in claim 5, further including a weighted sleeve fitted on said body and surrounding the lower section thereof and that portion of said upper section housing said magnet.

8. A flowmeter as set forth in claim 7, wherein said sleeve is constituted by inner and outer tantalum sections.

9. A variable area flowmeter as set forth in claim 1, further including an inlet guide rod of tantalum anchored at the end of said lower section and extending axially therefrom.

10. A flowmeter as set forth in claim 9, wherein said inlet guide is provided with tantalum cross pins which engage the wall of the inlet section of the tube.

* * * * *